United States Patent [19]

Jang

[11] Patent Number: 5,813,941

[45] Date of Patent: Sep. 29, 1998

[54] MANUAL SHIFT CONTROL DEVICE OF A TRANSMISSION CONTROL SYSTEM FOR AN AUTOMOTIVE AUTOMATIC TRANSMISSION

[75] Inventor: Jae Duk Jang, Kyunhki-do, Rep. of Korea

[73] Assignee: Hyundai Motor Company, Seoul, Rep. of Korea

[21] Appl. No.: 662,621

[22] Filed: Jun. 13, 1996

[30] Foreign Application Priority Data

Jun. 14, 1995 [KR] Rep. of Korea .................. 1995-15765

[51] Int. Cl.$^6$ .................................................. F16H 61/00
[52] U.S. Cl. ......................... 477/116; 477/117; 477/130; 475/123
[58] Field of Search .................... 477/116, 117, 477/130, 131, 152, 154, 155; 475/121, 128, 122, 123, 127, 129

[56] References Cited

U.S. PATENT DOCUMENTS

| | | | |
|---|---|---|---|
| 4,347,765 | 9/1982 | Leonard et al. ..................... | 475/129 X |
| 5,399,131 | 3/1995 | Kamada et al. ..................... | 477/152 X |
| 5,443,427 | 8/1995 | Ataka et al. ......................... | 477/154 X |
| 5,501,645 | 3/1996 | Taniguchi et al. .................. | 475/123 X |
| 5,505,672 | 4/1996 | Sakai et al. ............................. | 477/117 |
| 5,536,216 | 7/1996 | Jang ....................................... | 475/123 |
| 5,537,887 | 7/1996 | Jang et al. ........................... | 477/131 X |
| 5,556,356 | 9/1996 | Hakamada et al. ................. | 477/130 X |
| 5,558,599 | 9/1996 | Tsukamoto et al. ................. | 477/116 |
| 5,588,327 | 12/1996 | Downs et al. ........................ | 477/155 X |

Primary Examiner—Khoi Q. Ta
Assistant Examiner—Peter T. Kwon
Attorney, Agent, or Firm—Finnegan, Henderson, Farabow, Garrett & Dunner, L.L.P.

[57] ABSTRACT

A manual shift control device of a transmission control system for an automotive automatic transmission. A solenoid feed valve feeds line pressure passing through a pressure regulator valve to first, second and third solenoid valves. A torque control regulator valve changes drive pressure into torque pressure. A control switch valve alternatively feeds torque pressure to first and second torque pressure passages. An N-D control valve sequentially feeds torque pressure and drive pressure to a second friction member, which is applied at an initial shift operation together with a first friction member, to thereby alleviate shift shock from neutral range "N" to drive range "D". A first-to-second speed shift valve feeds part of the torque pressure and part of the drive pressure to a third friction member during a shift operation from the first speed to the second speed. A second-to-third speed shift valve feeds part of the torque pressure as well as part of the hydraulic pressure to a fourth friction member during a shift operation from the second speed to the third speed. A third-to-fourth speed shift valve feeds part of the torque pressure as well as part of the hydraulic pressure fed to the fourth friction member and, at the same time, interrupts the hydraulic pressure feeding to the first friction member during a shift operation from the third speed to the fourth speed. The third-to-fourth speed shift valve feeds drive pressure to the seventh friction member when manual shifting from the fourth speed to the second speed of a second "2" range. An N-R control valve feeds hydraulic pressure to a sixth friction member during reverse "R" range. A shock alleviator absorbs shift shock by the hydraulic pressure.

4 Claims, 12 Drawing Sheets

FIG.8

| SHIFT MODE | | C1 | C2 | C3 | B1 | B2 | B3 | B4 | F1 | F2 | F3 | ENGINE BRAKE |
|---|---|---|---|---|---|---|---|---|---|---|---|---|
| P | | | | | ○ | | | | | | | |
| R | | | ○ | | ○ | | ○ | | | | | ○ |
| N | | | | | ○ | | | | | | | |
| D (O/D ON) | 1 | ○ | | | ○ | | | | ○ | | | |
| | 2 | ○ | | | ○ | ○ | | | | | ○ | |
| | 3 | ○ | ○ | | ○ | ○ | | | | | ○ | ○ |
| | 4 | | ○ | ○ | | ○ | | | | | | ○ |
| 3 (O/D OFF) | 1 | ○ | | | ○ | | | | ○ | | | |
| | 2 | ○ | | | ○ | ○ | | | | | ○ | |
| | 3 | ○ | ○ | | ○ | ○ | | | | | ○ | ○ |
| 2 | 1 | ○ | | | ○ | | | | ○ | | ○ | |
| | 2 | ○ | | | ○ | ○ | | ○ | | | ○ | ○ |
| 1 | 1 | ○ | | | ○ | | ○ | | ○ | ○ | ○ | ○ |

MANUAL SHIFT CONTROL DEVICE OF A TRANSMISSION CONTROL SYSTEM FOR AN AUTOMOTIVE AUTOMATIC TRANSMISSION

BACKGROUND

This invention relates to a shift control system for an automotive automatic transmission, and more particularly, to a manual shift control device of a transmission control system for an automotive automatic transmission.

A conventional automatic transmission for a vehicle comprises a torque converter having an impeller, a turbine and a stator, a gear train connected to the torque converter to provide various forward speed ranges and reverse, a plurality of friction members such as disc clutches, one-way clutches which control gear action, and a hydraulic control system for controlling the operation of the friction members.

The hydraulic control system comprises a pressure regulator device for regulating hydraulic pressure generated from a hydraulic pump, a manual and automatic transmission control device for setting shift modes, a pressure control device for controlling shift quality and shift response to thereby smoothly set shift modes, a damper clutch control device for operating a damper clutch of the torque converter, and a hydraulic pressure distribution device for distributing adequate hydraulic pressure to each friction member.

The hydraulic pressure control device controls line pressure, torque converter pressure, solenoid valve pressure, and etc. which are applied to the friction members and practically affect shift quality.

Therefore, it is desirable that torque pressure is applied to the friction members during a shift operation, while after completing the synchronism, drive pressure instead of the torque pressure is applied to the friction members.

In the Korean Patent Appln. Nos. 93-11131 and 94-37992 applied by the present applicant, the hydraulic pressure control system, in which torque pressure and drive pressure can be alternately applied to the friction members, has already been suggested.

But, the above system has a problem that when the shift mode is manually changed from the neutral mode to the drive mode as well as to the reverse mode, line pressure is directly applied to the friction members so that shift shock can occur.

In addition, there is another problem that when manual shifting from the fourth speed of the drive "D" range to the second speed of the second "2" range as well as from the third speed of the drive "D" range to the first speed of the lockup "L" range, there can be a resulting slow shift response as well as shift shock.

SUMMARY

Accordingly, the present invention has been made in an effort to solve the above-described problems.

It is an object of the present invention to provide a manual shift control device of a transmission control system for an automotive automatic transmission which can quicken shift response and alleviate shift shock during a shift operation.

According to one aspect of the present invention, a manual shift control device of a transmission control system for an automotive automatic transmission comprises:

a hydraulic pump for generating hydraulic pressure, the hydraulic pump being operated by driving force of an engine;

a pressure regulator valve for regulating hydraulic pressure generated from the hydraulic pump in response to the vehicle's driving conditions;

a solenoid feed valve for feeding line pressure passing through the pressure regulator valve to first, second and third solenoid valves via line pressure passages;

a manual valve for feeding hydraulic pressure to a drive pressure passage in a drive "D" range and to a reverse pressure passage in a reverse "R" range while varying its ports in accordance with the position of a shift selector lever;

a torque control regulator valve for changing drive pressure fed from the manual valve into torque pressure in accordance with the duty-control of a third solenoid valve;

a control switch valve for alternately feeding torque pressure fed from the torque control regulator valve to first and second torque pressure passages in accordance with the ON/OFF operation of a fourth solenoid valve;

an N-D control valve for sequentially feeding torque pressure and drive pressure to a second friction member, which is applied at an initial shift operation together with a first friction member, to thereby alleviate shift shock occurring in a shift operation from a neutral range "N" to a drive range "D";

a first-to-second speed shift valve for feeding part of the torque pressure fed from the first and second torque pressure passages as well as part of the drive pressure fed from the manual valve to a third friction member through a second clutch valve while varying its ports in accordance with the ON/OFF operation of a fifth solenoid valve during a shift operation from the first speed to the second speed of the drive "D" range;

a second-to-third speed shift valve for feeding part of the torque pressure fed from the first-to-second speed shift valve as well as part of the hydraulic pressure fed to the third friction member to a fourth friction member through a third clutch valve while varying its ports in accordance with the ON/OFF operation of a sixth solenoid valve during a shift operation from the second speed to the third speed of the drive "D" range;

a third-to-fourth speed shift valve for feeding part of the torque pressure fed from the second-to-third speed shift valve as well as part of the hydraulic pressure fed to the fourth friction member through a fourth clutch valve and, at the same time, interrupting the hydraulic pressure feeding to the first friction member while varying its ports with the operation of a seventh solenoid valve during a shift operation from the third speed to the fourth speed of the drive "D" range, the third-to-fourth speed shift valve feeding drive pressure fed from the manual valve to the seventh friction member through the third and second clutch valves when manual shifting from the fourth speed of the drive "D" range to the second speed of a second "2" range;

an N-R control valve for feeding hydraulic pressure fed from the manual valve via the reverse pressure passage to a sixth friction member while varying its ports in accordance with the control of the third solenoid valve in the reverse "R" range; and a shock alleviating means for absorbing shift shock generated by hydraulic pressure.

The third-to-fourth speed shift valve is provided with a valve body having a first port for receiving torque pressure from one port of the second-to-third speed shift valve, a second port for receiving part of the torque pressure fed to the fourth friction member, a third port for receiving hydraulic pressure from the line pressure passage, a fourth port for receiving line pressure controlled by the seventh solenoid valve, a fifth port for feeding torque pressure fed to the first port to the fifth friction member via the fourth clutch valve, a sixth port for receiving drive pressure from the manual valve in the second "2" and lockup "L" ranges, and a seventh port for feeding drive pressure fed to the sixth port to the seventh friction member via the second and third clutch valves.

The third-to-fourth speed shift valve is further provided with a valve spool having a first land on opposite faces of which each line pressure coming through the third and fourth ports acts, a second land on which torque pressure coming through the second port acts, a third land for selectively communicating the first port with the fifth port, and a fourth land for selectively communicating the sixth port with the seventh port.

The shock alleviating means further comprises a first accumulator which is disposed on the passage for feeding hydraulic pressure from the fourth clutch valve to the first friction member to alleviate shift shock generated by line pressure.

The shock alleviating means again comprises a second accumulator which is disposed on the passage for feeding hydraulic pressure from the N-D control valve to the second friction member to alleviate shift shock generated by both torque pressure and line pressure.

The shock alleviating means also comprises a third accumulator which is disposed on the passage for feeding hydraulic pressure from the second clutch valve to the third friction member to alleviate shift shock generated by torque pressure as well as drive pressure.

And further, the shock alleviating means comprises a fourth accumulator which is disposed on the passage for feeding hydraulic pressure from the second clutch valve to the seventh friction member to alleviate shift shock generated by drive pressure.

The manual shift control device of the present invention further comprises a power train having:

an engine being a power source;

a torque converter connected to a crankshaft of the engine;

a first shift part comprising a compound planetary unit, which is composed of two simple planetary gear units, the compound planetary unit having a first sun gear being formed in a body with a second shaft to thereby selectively work as an input element, the second shaft being connected to a first shaft by inserting the second friction member therebetween, a second pinion gear being connected to a first ring gear through a second power transmission member to be controlled by a first one way clutch and the sixth friction member therebetween and thereby work as a reacting element, a first pinion gear being connected to a second ring gear through a third power transmission member to be an output element, and a second sun gear being formed in a body with a second shaft to selectively work as an input element, the second shaft being connected to the first shaft by inserting a first power transmission member and the fourth friction member therebetween, the second sun gear being controlled by a second one way clutch and the third and seventh friction members to thereby be a reacting element; and a second shift part comprising a simple planetary gear unit having a third ring gear meshing with a first output gear of the first shift part to be an input element, a third pinion gear meshing with the third ring gear to be an output element, a third sun gear being controlled by a third one way clutch and the first friction member to thereby be a reacting element.

BRIEF DESCRIPTION OF THE DRAWING

The accompanying drawings, which are incorporated in and constitute a part of the specification, illustrate an embodiment of the invention, and, together with the description, serve to explain the principles of the invention:

FIG. 8 is a table illustrating the operational elements of the power train of FIG. 6 at each shift mode;

DESCRIPTION

Figure 1:
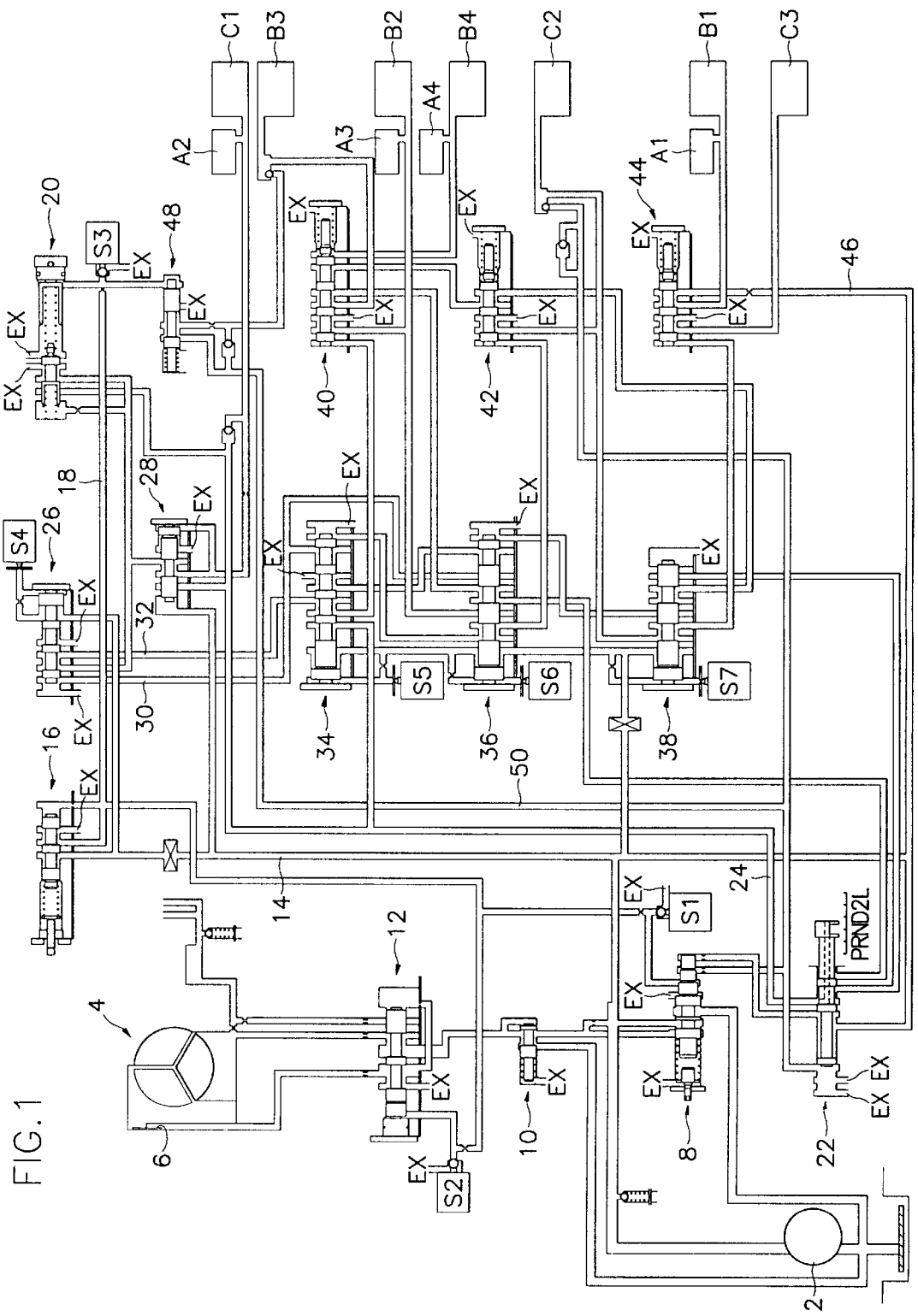
FIG. 1 is a schematic view of a transmission control system (TCU) of an automatic transmission according to a preferred embodiment of the present invention.

Preferred embodiments of the present invention will now be described in detail with reference to the accompanying drawings.

Certain terminology will be used in the following description for convenience and references only and will not be limiting. The words "right" and "left" will designate directions in the drawings to which reference is made.

Referring first to FIG. 1, a hydraulic control system according to a preferred embodiment of the present invention includes a hydraulic pump 2 operated by driving force of an engine (not shown), a torque converter 4 for transmitting power of the engine to an input shaft of a transmission, a damper clutch 6 being disposed in the torque converter for enhancing transmission power efficiency, a pressure regulator valve 8 for regulating hydraulic pressure generated from the hydraulic pump in response to the vehicle's driving conditions, a converter feed valve feeding the hydraulic pressure passing through the pressure regulator valve 8 to the torque converter 4 as drive pressure and to each component requiring lubrication, and a converter clutch regulator valve 12 for controlling the operation of the damper clutch.

The pressure regulator valve 8 and the converter clutch regulator valve 12 are respectively controlled by first and second solenoid valves S1 and S2 that are duty-controlled by a transmission control unit ("TCU").

The pressure regulator valve 8 is connected to a solenoid supply valve 16 through a line pressure passage 14 to supply hydraulic pressure thereto.

The solenoid supply valve 16 reduces hydraulic pressure fed from the hydraulic pump 2 through the passage 14 and supplies the pressure to the first and second solenoid valves S1 and S2 as well as a third solenoid valve S3 through a passage 18.

The third solenoid valve S3 is connected to a torque control regulator valve 20 to control the operation of the torque control regulator valve 20.

The torque control regulator valve 20 is connected to a manual valve 22, which varies its ports in accordance with the position of a shift selector lever (not shown), through a drive pressure passage 24 to receive drive pressure therefrom.

The torque control regulator valve 20 feeds torque pressure duty-controlled by the third solenoid valve S3 to a control switch valve 26 and to an N-D control valve 28 that alleviates shift shock occurring when manual shifting from a neutral range "N" to a drive range "D".

The N-D control valve 28 first feeds the torque pressure to a second friction member C1 which is applied at an initial shift operation together with a first friction member B1, and then replaces the torque pressure with drive pressure by changing its ports, thereby alleviating shift shock.

A second accumulator A2 is disposed on the passage for supplying hydraulic pressure to the second friction member C1 to absorb shift shock by the torque pressure.

The control switch valve 26 alternately feeds the torque pressure fed from the torque control regulator valve 20 to first and second torque pressure passages 30 and 32 in accordance with the ON/OFF operation of a fourth solenoid valve S4 controlled by the TCU.

The first and second torque pressure passages 30 and 32 both extend to a first-to-second speed shift valve 34. The first-to-second speed shift valve 34 feeds drive pressure fed from a drive pressure passage to a third friction member B2 in accordance with the ON/OFF operation of a fifth solenoid valve S5 controlled by the TCU.

A third accumulator A3 is disposed on the passage for supplying hydraulic pressure to the third friction member B2 to alleviate shift shock by the torque and drive pressures during a shift operation from the second speed to the first speed.

A second-to-third speed shift valve 36, which varies its ports in accordance with the ON/OFF operation of a sixth solenoid valve S6 controlled by the TCU, feeds part of the hydraulic pressure being fed to the friction member B2 to a fourth friction member C2 to accomplish a third speed.

A third-to-fourth speed shift valve 38, which varies its ports with the operation of a seventh solenoid valve S7 controlled by the TCU, feeds part of the hydraulic pressure being fed to the fourth friction member C2 to a fifth friction member C3.

A second clutch valve 40 receiving the drive pressure from the first-to-second speed shift valve 34 at the second speed of the drive "D" range feeds the received drive pressure to the third friction member B2 as well as to the second-to-third speed shift valve 36. The second clutch valve 40 is also connected to a third clutch valve 42 linked with the third-to-fourth shift valve 38, and thereby feeds the hydraulic pressure fed therefrom to a sixth friction member B3 and a seventh friction member B4.

A fourth accumulator A4 is disposed on the passage for supplying hydraulic pressure to the seventh friction member B4 to alleviate shift shock generated by the drive pressure fed from the second clutch valve 40 during the shift operation.

The third clutch valve 42 receives torque and drive pressures from the second-to-third speed shift valve 36 and then feeds the received pressures to the fourth friction member C2 as well as to the third-fourth speed shift valve 38.

The fourth clutch valve 44 receives torque and drive pressure from the third-fourth speed shift valve 38 and then feeds the received pressure to the fifth friction member C3. At the same time, the fourth clutch valve 44 feeds hydraulic pressure fed along a passage 46 to the first friction member B1 which is designed to be applied at the first, second and third speeds of the drive "D" range.

A N-R control valve 48 controlled by the third solenoid valve S3 feeds the drive pressure fed through a rear pressure passage connected with the manual valve 22 in the rear "R" range to the sixth friction member B3.

The manual transmission control device described above will be described more in detail hereinbelow according to its function.

Figure 2:
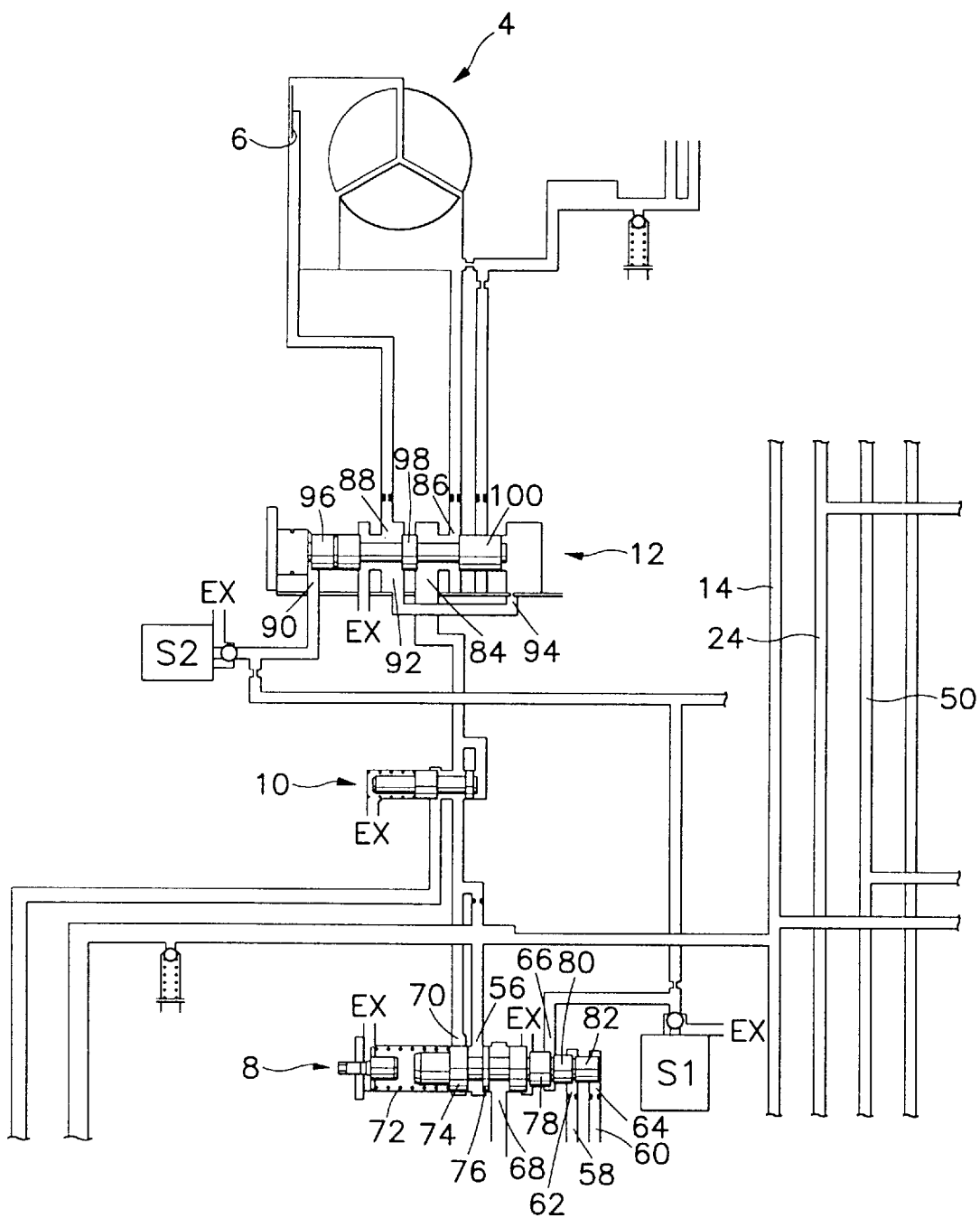
FIG. 2 is a detail view of a pressure regulator unit of the TCU illustrated in FIG. 1.

Referring to FIG. 2 showing a pressure regulator part of the present manual transmission control device, the pressure regulator valve 8 is provided with a first port 56 for receiving hydraulic pressure produced by the hydraulic pump 2, a second port 62 connected to the manual valve through a reverse pressure passage 58, a third port 64 connected to the manual valve 22 through a main passage 60, a fourth port 66 for receiving hydraulic pressure controlled by the first solenoid valve S1, a fifth port 69 for exhausting excessive hydraulic pressure, and a sixth port 70 for feeding hydraulic pressure to the converter feed valve 10.

The pressure regulator valve 8 comprises a valve spool having a first land 74 biased by a spring 72 for opening and closing the sixth port 70, a second land 76 for adjusting opening of the fifth port 68, and third, fourth and fifth lands 78, 80 and 82 on which hydraulic pressure coming through each of the fourth, second and third ports 66, 62 and 64 acts.

The converter feed valve 10 is designed to receive hydraulic pressure from the sixth part 62 and then feed the received hydraulic pressure to the converter clutch regulator valve 12.

The converter clutch regulator valve 12 controls the operation of the damper clutch 6 of the torque converter 4 and feeds oil to each component requiring lubrication in accordance with the operation of the second solenoid valve S2 controlled by the TCU.

The converter clutch regulator valve 12 is provided with a first port 84 for receiving hydraulic pressure, a second port 86 for feeding damper clutch apply pressure to the torque converter 4, a third port 88 for feeding damper clutch release pressure to the torque converter 4, a fourth port 90 at which hydraulic pressure is formed or released by the operation of the second solenoid valve S2, and fifth and sixth ports 92 and 94 for feeding hydraulic pressure resisting against hydraulic pressure fed to the fourth port 90.

The converter clutch regulator valve 12 comprises a valve spool having a first land 96 on which hydraulic pressure coming through the fourth port 90 acts, a second land 98 for selectively communicating the first port 84 with the second port 86 or the third port 88, and a third land 100 on which hydraulic pressure coming through the sixth port 94 acts.

Figure 3:
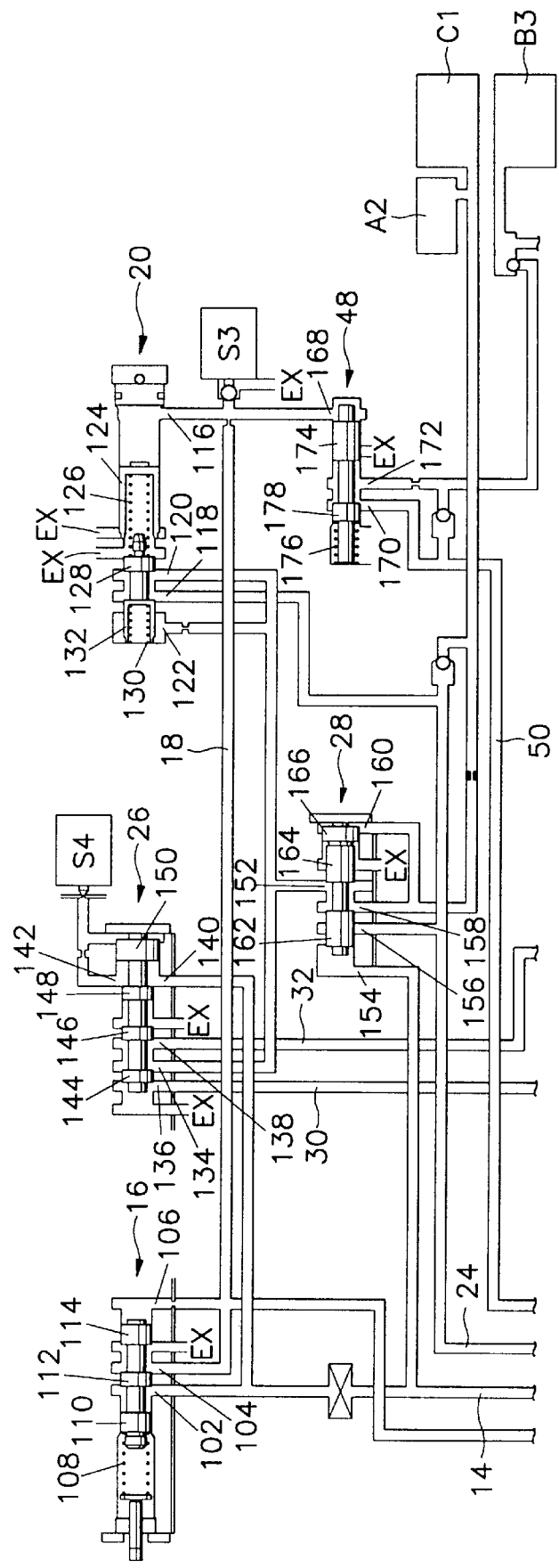
FIG. 3 is a detail view of torque pressure transformation and supply units of the TCU illustrated in FIG. 1.

Referring to FIG. 3 showing a torque pressure control part of the present manual transmission control device, the solenoid supply valve 16 for feeding line pressure fed from the pressure regulator valve 8 along the line pressure passage 14 to the first, second and third solenoid valves S1, S2 and S3 is provided with a first port 102 connected to the line pressure passage 14, a second port 104 for feeding hydraulic pressure coming through the first port 102 to the passage 18, a third port 106 receiving hydraulic pressure leaving through the second port 104 to vary the ports.

Further, the solenoid supply valve 16 comprises a valve spool having a first land 110 biased by a spring (108), a second land 112 for adjusting an opening of the second port 104, and a third land 114 on which hydraulic pressure coming through the third port 106 acts.

The torque control regulator valve 20 is provided with a first port 116 for receiving control pressure, a second port 118 for receiving hydraulic pressure from the manual valve 22 along the drive pressure passage 24, and third and fourth ports 120 and 122 to which each hydraulic pressure coming through the second port 118 is selectively fed.

The torque control regulator valve 20 comprises a valve spool having a plug 124 biased by one end of a spring 126, a land 128 biased by the other end of the spring 126 and a spool valve 132 biased by another spring 130.

The control switch valve 26 selectively receiving hydraulic pressure from the second and third ports 118 and 120 is provided with a first port 134 for receiving torque pressure from the third port 120 of the torque control regulator valve 20, second and third ports 136 and 138 through which the hydraulic pressure coming through the first port 134 is selectively exhausted to the first and second torque pressure passages 30 and 32, a fourth port 140 for receiving hydraulic pressure from the line pressure passage 14 and a fifth port 142 for applying hydraulic pressure resisting against the hydraulic pressure coming through the fourth port 140 to the spool, the fifth port 142 being connected to the fourth solenoid valve S4.

The control switch valve 26 comprises a valve spool having a first land 144 for opening and closing the first and second ports 134 and 136, a second land 146 for opening and closing the first and third ports 134 and 138, a third land 148 on which hydraulic pressure coming through the fourth port 140 acts, and a fourth land 150 on which hydraulic pressure coming through the fifth port 142 acts.

The N-D control valve 28 in provided with a first port 152 for receiving torque pressure, a second port 154 for receiving line pressure, a third port 156 for receiving drive pressure, a fourth port 158 for feeding hydraulic pressure coming through the third port 156 to the second friction member C1, and a fifth port 160 for receiving hydraulic pressure leaving through the fourth port 158 to thereby vary its ports.

The N-D control valve 28 comprises a valve spool having a first land 162 on which line pressure coming through the second port 154 acts, a second land 164 interrupting torque pressure being fed to the first port 144, and a third land 166 interrupting drive pressure being fed to the fifth port 152.

An N-R control valve 48 feeds line pressure fed from the manual valve 22 to the sixth friction member B3 in the reverse "R" range. The N-R control valve is provided with a first port 168 for receiving control pressure of the third solenoid valve S3, a second port 170 for receiving reverse pressure from the manual valve 22 along the reverse pressure passage 50, and a third port 172 for feeding reverse pressure coming through the second port 170 to the sixth friction member B3.

The N-R control valve 48 comprises a valve spool having a first land 174 on which control pressure coming through the first port 168 acts and a second land 178 for controlling the second port 170, the second land 178 being biased by a spring 176.

Figure 4:
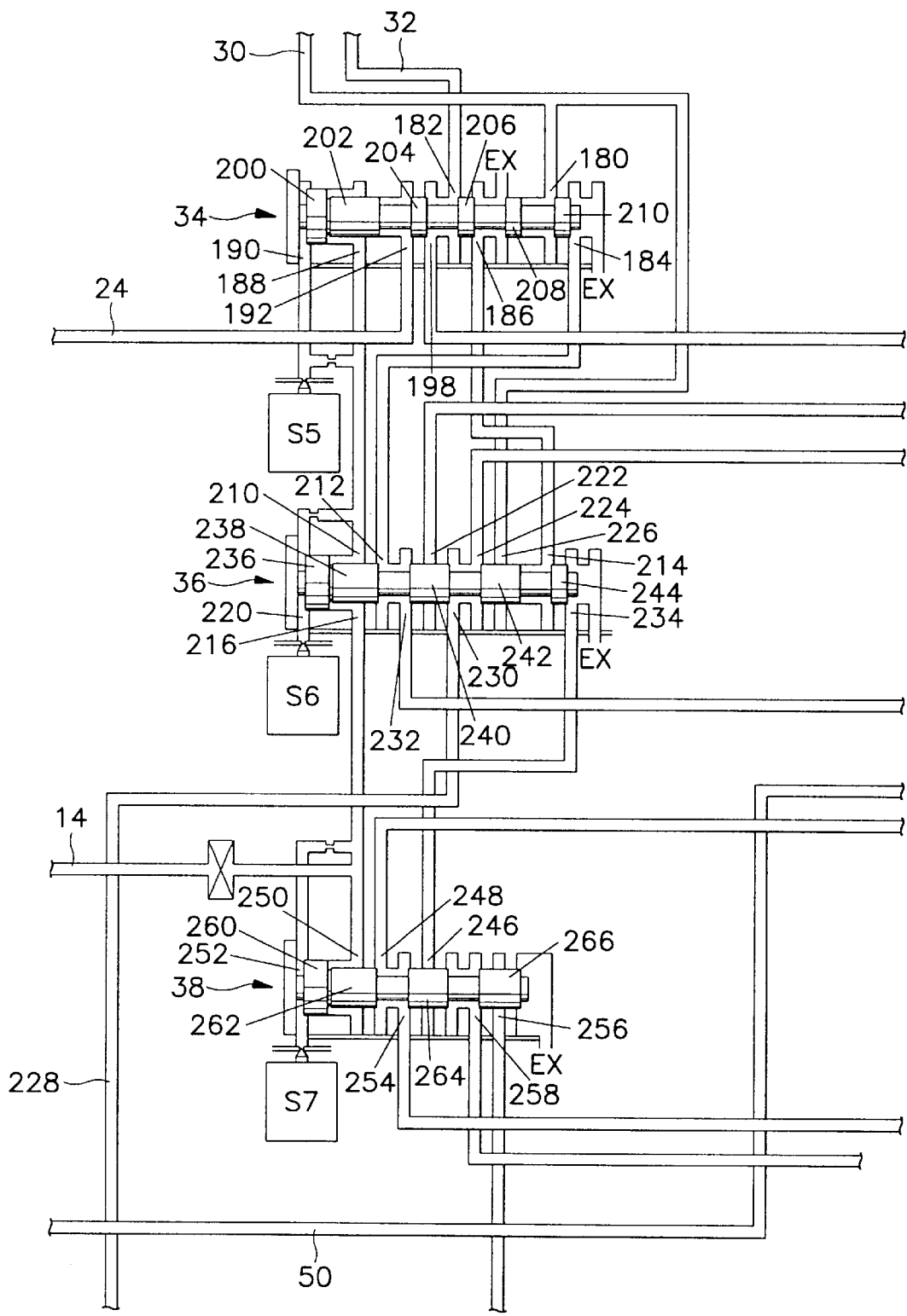
FIG. 4 is a view showing connections of shift valves of the TCU illustrated in FIG. 1.

Referring to FIG. 4 illustrating a first shift control part, the first-to-second speed shift valve 34, which feeds apply pressure to the third friction member B2 during a shift operation from the first speed to the second speed in the drive "D" range, is provided with first and second ports 180 and 182 for respectively receiving torque pressure from the first and second torque pressure passages 30 and 32.

The first-to-second speed shift valve 34 is further provided with a third port 184 for feeding torque pressure coming through the first port 180 to one port of the second-to-third speed shift valve 36, a fourth port 186 for feeding hydraulic pressure coming through the second port 182 to another port of the second-to-third speed shift valve 36, a fifth port 188 for receiving hydraulic pressure from the line pressure passage 14 via the second-to-third speed shift valve 36, a sixth port 190 for receiving hydraulic pressure leaving from the second-to-third speed shift valve 36 and being controlled by the ON/OFF operation of the fifth solenoid valve S5, a seventh port 192 for receiving hydraulic pressure from the drive pressure passage 24, and an eighth port 198 for feeding hydraulic pressure coming through the seventh port 192 to the second clutch valve 40.

The first-to-second speed shift valve 34 comprises a valve spool having a first land 200 on opposite faces of which each line pressure coming through the fifth and sixth ports 188 and 190 respectively acts, a second land 202 on which drive pressure coming through the seventh port 192 acts, a third land 204 for selectively connecting/disconnecting the seventh and eighth ports 192 and 198 with each other, a fourth land 206 for communicating the second port 182 alternately with the seventh port 188 or eighth port 192, a fifth land 208 on which part of the torque pressure coming through the first port 180 acts, and a sixth land 210 on which torque pressure coming from the first port 18 to the third port 184 acts.

The second-to-third speed shift valve 36, which feeds drive pressure to the fourth friction member C2 during a shift operation from the second speed to the third speed in the drive "D" range, is provided with a first port 212 connected to the third port 184 of the first-to-second speed shift valve 34 to receive the first torque pressure therefrom, a second port 214 connected to the fourth port 186 of the first-to-second speed shift valve 34 to receive the second torque pressure therefrom, a third port 216 for receiving hydraulic pressure from the line pressure passage 14, and a fourth port 218 for feeding hydraulic pressure coming through the third port 216 to the fifth and sixth ports 188 and 190 of the first-to-second speed shift valve 34.

The second-to-third speed shift valve 36 is further provided with a fifth port 220 for receiving hydraulic pressure fed from the fourth port 218 and controlled by the sixth solenoid valve S6, a sixth port 222 for receiving part of the second torque pressure fed to the third friction member B20, a seventh port 224 communicated with any one port of the second clutch valve 40, an eighth port 226 directly communicated with the first torque pressure passage 30, a ninth port 230 communicated with a passage 228 for receiving drive pressure in the lockup "L" range, a tenth port 232 for feeding torque pressure coming through the sixth port 222 to the third clutch valve 42, and an eleventh port 234 for feeding torque pressure coming through the second port 214 to any one port of the third-to-fourth speed shift valve 38.

The second-to-third speed shift valve 36 comprises a valve spool having a first land 236 on opposite faces of which each line pressure coming through the third and fifth ports 216 and 220 acts, a second land 238 on which part of the torque pressure at the first port 212 acts, a third land 240 for selectively communicating the sixth port 222 with the tenth port 232, a fourth land 242 for selectively connecting or disconnecting the second and eighth ports 224 and 226 with the ninth port 230, and a fifth land 244 for selectively communicating the second port 214 with the eleventh port 234.

The third-to-fourth speed shift valve 38, which releases operation of the first friction member B1 and feeds torque pressure to the fifth friction member C3, is provided with a first port 246 for receiving torque pressure from the eleventh port 234 of the second-to-third speed shift valve 36, a second port 248 for receiving part of the torque pressure fed to the fourth friction member C2, a third port 250 for receiving hydraulic pressure from the line pressure passage 14, and a fourth port 252 for receiving line pressure controlled by the seventh solenoid valve S7.

The third-to-fourth speed shift valve 38 is further provided with a fifth port 254 for feeding torque pressure fed to the first port 246 to the fifth friction member C3 via the fourth clutch valve 44, a sixth port 256 for receiving drive pressure from the manual valve 22 in the second "2" and lockup "L" ranges, and a seventh port 258 for feeding drive pressure fed to the sixth port 256 to the seventh friction member B4 via the second and third clutch valves 40 and 42.

The third-to-fourth speed shift valve 38 comprises a valve spool having a first land 260 on opposite faces of which each line pressure coming through the third port 250 and the fourth port 252 acts, a second land 262 on which torque pressure coming through the second port 248 acts, a third land 264 for selectively communicating the first port 246 with the fifth port 254, and a fourth land 266 for selectively communicating the sixth port 256 with the seventh port 258.

Figure 5:
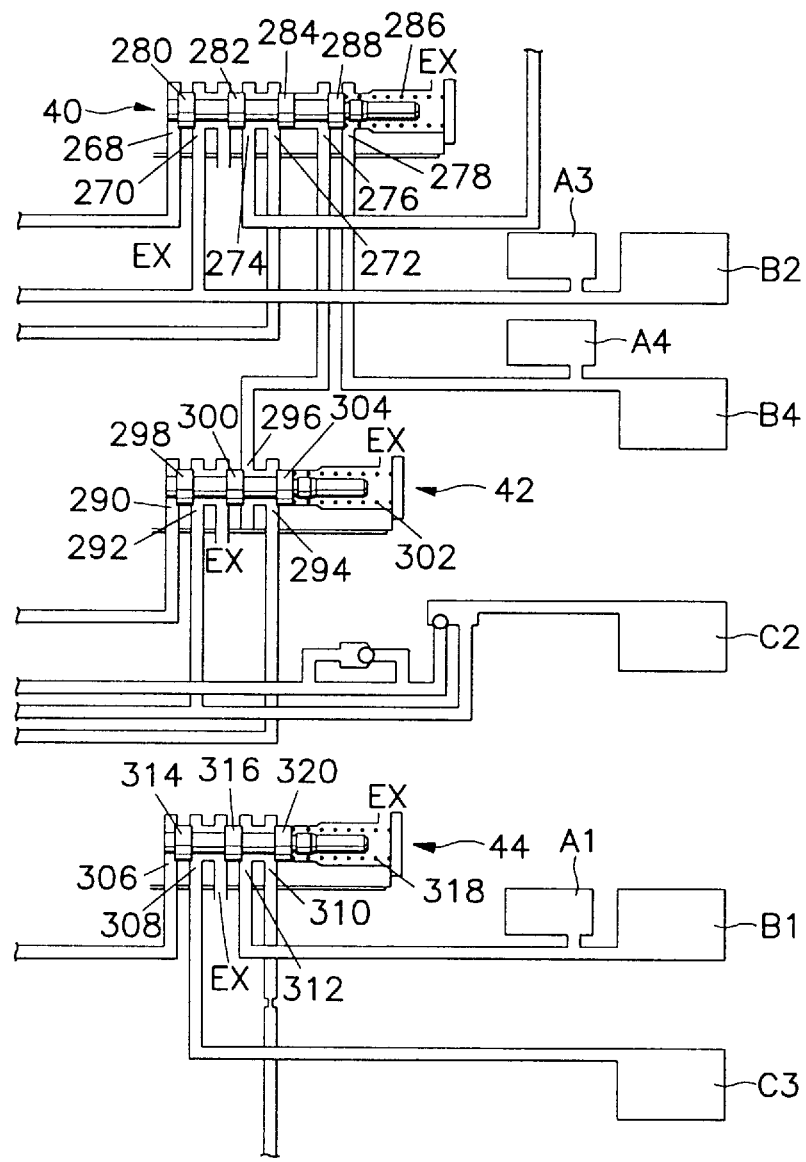
FIG. 5 is a view showing connections of clutch and brake valves of the TCU illustrated in FIG. 1.

Referring to FIG. 5 illustrating a second shift control part, the second clutch valve 40, which receives torque pressure as well as drive pressure from the first-to-second speed shift valve 34, is provided with a first port 268 for receiving torque pressure as well as drive pressure from the first-to-second speed shift valve 34 and a second port 270 for feeding torque pressure as well as drive pressure coming through the first port 268 to the third friction member B2 and to the second-to-third speed shift valve 36.

The second clutch valve 40 is further provided with a third port 272 for receiving hydraulic pressure from the seventh port 224 of the second-to-third speed shift valve 36, a fourth port 274 for feeding hydraulic pressure coming through the third port 272 to the sixth friction member B3, a fifth port 276 for receiving drive pressure from any one port of the third clutch valve 42 in the second "2" and lockup "L" ranges, and a sixth port for feeding drive pressure coming through the fifth port 276 to the seventh friction member B4.

A third accumulator A3 is disposed on a passage through which torque pressure as well as drive pressure coming through the first-to-second speed shift valve 34 is fed to the third friction member B2, the passage being connected to the second port 270 of the second clutch valve 40.

A fourth accumulator A4 is disposed on a drive pressure passage through which hydraulic pressure is fed from the sixth port 278 to the seventh friction member B4 to absorb shift shock occurring when drive pressure acts on seventh friction member B4.

The second clutch valve 40 comprises a valve spool having a first land 280 for selectively communicating the first port 266 with the second port 270, a second land 282 for selectively communicating the third port 272 with the fourth port 274, a third land 284 for segregating the third port 272 from the fifth port 276, and a fourth land 288 for selectively communicating the fifth port 276 with the sixth port 278, the fourth land 288 being biased by a spring 286.

The third clutch valve 42, which receives torque pressure as well as drive pressure from the second-to-third speed shift valve 36 and feeds this pressure to the fourth friction member C2, is provided with a first port 290 for receiving torque pressure as well as drive pressure from the second-to-third speed shift valve 36, a second port 292 for feeding hydraulic pressure coming through the first port 290 to the fourth friction member C2 and to the third-to-fourth speed shift valve 38, a third port 294 for receiving drive pressure fed from the manual valve 22 in the second "2" and lockup "L" ranges via the seventh port 258 of the third-to-fourth speed shift valve 38, and a fourth port 296 for feeding drive pressure coming through the third port 294 to the fifth port 276 of the second clutch valve 40.

The third clutch valve 42 comprises a valve spool having a first land 298 for selectively communicating the first port 290 with the second port 292, a second land 300 for selectively communicating the third port 294 with the fourth port 296, and a third land 304 biased by a spring 302.

The fourth clutch valve 44, which feeds line pressure to the first friction member B1 in the first, second and third speeds of the drive "D" range and torque pressure to the fifth friction member C3 in the fourth speed, is provided with a first port 306 for receiving torque pressure from the third-to-fourth speed shift valve 38, a second port 308 for feeding torque pressure coming through the first port 306 to the fifth friction member C3, a third port 310 for receiving hydraulic pressure from the line pressure passage 46, and a fourth port 312 for feeding line pressure coming through the third port 310 to the first friction member B1.

The fourth clutch valve 44 comprises a valve spool having a first land 314 for selectively communicating the first port 306 with the second port 308, a second land 316 for selectively communicating the third port 310 with the fourth port 312, and a third land 320 biased by a spring 318.

Figure 6:
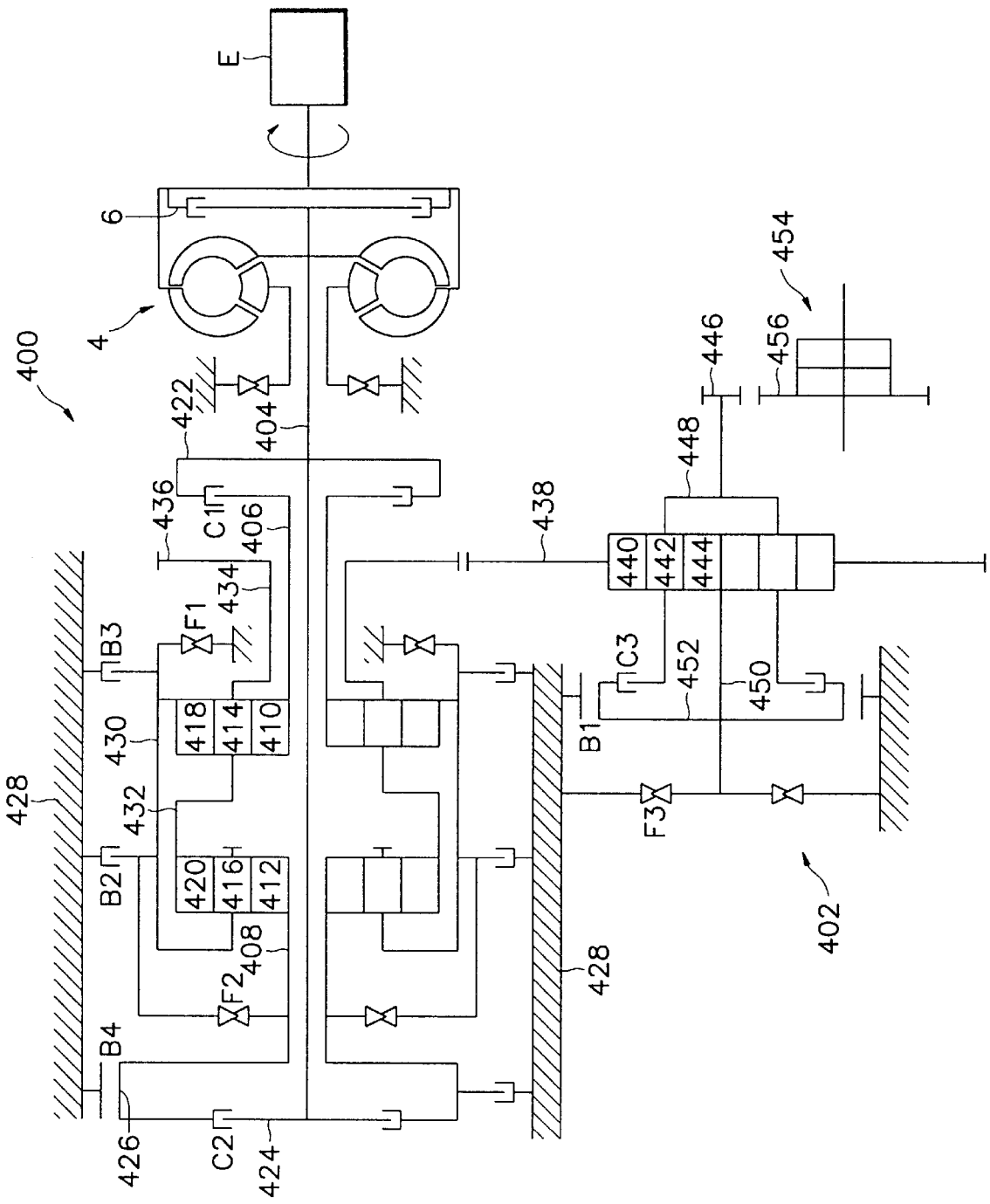
FIG. 6 is a schematic view showing a power train to which the TCU of the present invention is adapted.

FIG. 6 shows one example of a power train to which the hydraulic pressure control device of the present invention is adapted.

The power train comprises an engine E which is a power source, a torque converter 4 connected to a crankshaft of the engine E, a first shift part 400 composed of a planetary gear unit to convert torque from the torque converter 4 into various speed ratios, and a second shift part 402 composed of a planetary gear unit to shift the speed ratio shifted at the first shift part to a speed ratio.

The first shift part 400 includes a compound planetary unit, which is composed of two simple planetary gear units, disposed on a first shaft 404, second and third shafts 406 and 408 disposed around the first shaft 404, a first sun gear 410 disposed on the second shaft 406, a second sun gear 412 disposed on the third shaft 408, a first pinion gear 414 meshing with the first sun gear 410, a second pinion gear 416 meshing with the second sun gear 412, a first ring gear 418 meshing with the first pinion gear 414, and a second ring gear 420 meshing with the second pinion gear 416.

Further, the second and third shafts 406 and 408 are respectively connected to first and second hubs 422 and 424, which are formed on both sides of the first shaft 404, by inserting the second friction member C1 and the fourth friction member C2 therebetween, such that the first and second sun gear 410 and 412 can selectively be input elements.

The third shaft 408 is connected to the fourth friction member C2 through a first power transmission member 426. The first power transmission member 426 is connected to a transmission housing 428 by inserting the seventh friction member B4 therebetween.

The second pinion gear 416 is connected to the first ring gear 418 through a second power transmission member 432 and to the transmission housing 428 by inserting a first one way clutch F1 and the sixth friction member B3 therebetween.

The first pinion gear 414 is connected to the second ring gear 420 through a third power transmission member 432. The third power transmission member 432 is extended into a fourth power transmission member 434 being an output element.

The first one-way clutch F1 operates as illustrated in FIG. 8 and prevents the second power transmission member 430 from rotating in an opposite direction to the rotating direction of the engine to work the second power transmission member 430 as a reacting element in the first speed of the drive, second and lockup ranges "D", "2" and "L".

The fourth power transmission member 434 is provided with a first output gear 436 of the first shift part 400.

The third shaft 408 is connected to the is transmission housing 428 by inserting a second one way clutch F2 and the third friction member B2 therebetween.

The second one-way clutch F2 permits the third shaft 408 to rotate only in the rotating direction of the engine but not in the reverse direction thereto. The third friction member B2, as illustrated in FIG. 8, operates in the second, third and fourth speeds of the drive "D" range and the second speed of the second "2" range.

The second shift part 402 receiving power from the first output gear 436 of the first shift part 400 comprises a simple planetary gear unit having an input gear 438 outer-meshing with the first output gear 436, a third ring gear 440 connected with the input gear 438, a third pinion gear 442 inner-meshing with the third ring gear 440, and a third sun gear 444 inner-meshing with the third pinion gear 442.

The third pinion gear 442 is, at one end, connected to a second output gear 446 through a fifth power transmission member 448. The fifth power transmission member 448 is connected to a sixth power transmission member 452 by inserting the fifth friction member C3. The sixth power transmission member 452 is combined in a body with a fourth shaft 450 which supports the third sun gear 444 to be rotated.

The sixth power transmission member 452 is connected to the transmission housing 428 by inserting the first friction member B1 therebetween.

The fourth shaft 450 is restricted in its rotation by a third one-way clutch F3 in a clockwise direction when viewed from the engine side. The third one way clutch F3 is inserted between the fourth shaft 450 and the transmission housing 428. The second output gear 446 meshes with the final reduction gear 456 of the differential 454.

Figure 7:
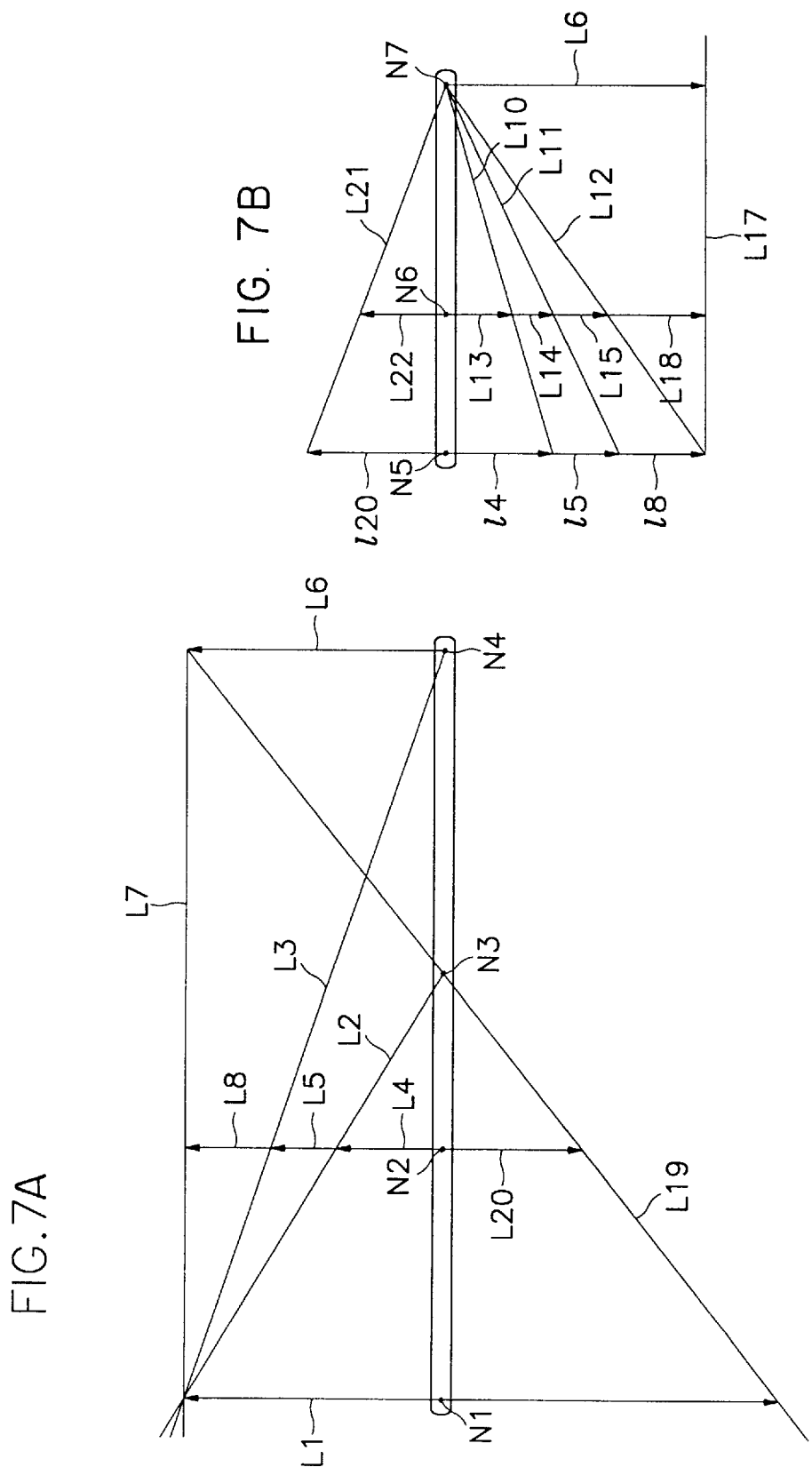
FIG. 7 is a graphical illustration of the speed ratio output from the power train of FIG. 6 by lever analogy.

As illustrated in FIG. 7 showing lever analogy, the lever L indicating the first shift part is, at its left end, represented by a first node N1 having the first sun gear 410, a second node N2 having the third and fourth power transmission members 432 and 434 which is placed adjacent to the first node N1, and a third node N3 having the second power transmission member 430 which is also placed adjacent to the first node N1 while, at its right end, represented by a fourth node N4 having the second sun gear 412.

The lever 1 indicating the second shift part is, at its left end, represented by a fifth nods N5 having the third ring gear 440, and a sixth node N6 having the fifth power transmission member 448 which is placed adjacent to the fifth node N5 while, at its right end, represented by a seventh node N7 having the third sun gear 444.

Therefore, in the first and second speeds of the drive "D", second "2" and lockup "L" ranges, the first node N1 corresponding to the first sun gear 410 of the first shift part 400, into which power from the engine is inputted, works as an input element while the third node N3 corresponding to the second power transmission member 430 and the fourth node N4 corresponding to the second sun gear 412 respectively work as a fixing element.

Therefore, straight lines L2 and L3 connect an arbitrary position on the speed input line L1 at the first node N1 of the lever L with the third and fourth nodes N3 and N4. Output speed lines L4 and L5 of the first and second speeds are the lines being connected to the second node N2 having the straight lines L2 and L3 as its output elements, with a shortest distance therebetween.

Since, in the third speed, the first and second sun gears 410 and 412 respectively work as an input element, the first node N1 and the fourth node N4 become input elements. Thus, an output speed line L8 of the third speed is the line which connects the straight line L7, connecting the input speed lines L1 and L6 with each other, to the second node N2 with the shortest distance therebetween.

As described above, when the rotating power of the first, second and third speeds obtained in the first shift part 400 is gradually reduced in the second shift part 402, the fifth node N5 corresponding to the third ring gear 440 formed in a body with the input gear 438 meshing with the first output gear 436 works as an input element while the seventh node N7 corresponding to the third sun gear 444 fixed by the first friction member B1 works as a fixing element.

Accordingly, output lines L13, L14 and L15 of the first, second and third speeds outputted from the second shift part 402 are the lines respectively connecting straight lines L10, L11 and L12, which correspond to the positions of the first, second and third speeds on the lever L of the first shift part 400 and connect the fifth node N5 with the seventh node N7, to the sixth node N6 with the shortest distance therebetween.

In the fourth speed, application of the first friction member B1 of the second shift part 402 is released in the state of third speed of the first shift part 400 and the fifth friction member C3 is applied to a stop operation of the third sun gear 444.

Therefore, the seventh node N7 corresponding to the third sun gear 44 is inputted while locking the planetary gear unit of the second shift part 402. At this time, an output line L18 of the fourth speed is the line connecting the straight line L17, which connects the speed input line L16 of the seventh node N7 with the third speed position of the speed input line l8 of the fifth node N5, to the sixth node N6 with the shortest distance therebetween.

Since, in the reverse "R" range, the fourth node N4 corresponding to the second sun gear 412 works as an input element while the third node N3 corresponding to the second power transmission member 430 works as a fixing element, a reverse output line L20 is the line connecting the straight line L19, which connects the fourth node N4 with the third node N3, to the second node N2 being an output element with the shortest distance therebetween.

The output obtained in the first shift part 400 is inputted into the fifth node N5 of the second shift part 402 and the seventh node N7 works as a fixing element. At this time, a last reverse output line L22 is the line connecting the straight line L21, which connects the fifth node N5 with the seventh node N7, to the sixth node N6.

The shift operation in the hydraulic control device and the power train will be described hereinafter.

When the engine operates in the neutral "N" range, the first solenoid valve S1 is duty-controlled by the TCU to vary hydraulic pressure fed to the fourth port 66 of the pressure regulator valve 8 when the fifth and sixth solenoid valves S5 and S6 are in an ON state while the seventh solenoid valve S7 is in an OFF state.

Accordingly, since the hydraulic pressure acting on the third land 78 of the pressure regulator valve 8 is increased or decreased, the fifth port 68 communicates with the first port 56, and thereby hydraulic pressure generated from the hydraulic pump 2 is exhausted or interrupted.

The line pressure is regulated by the above operation and fed to the first port 102 of the solenoid supply valve 16, and then leaves through the second port 104.

Part of the hydraulic pressure leaving through the second port is fed to the third port 106 to act on the right face of the third land 114, and thereby displacing the valve spool of the solenoid supply valve 16 towards the left.

Therefore, the second land 112 partly closes the second port 104 so that hydraulic pressure fed to the third port 106 through the second port 104 is lowered, whereby the valve spool is displaced towards the right by the elastic force of the spring 108.

As this operation is repeatedly performed, the hydraulic pressure leaving through the second port 104 is fed to the first port 116 of the torque control regulator valve 20. The hydraulic pressure coming through the first port 116 is regulated by the duty-control of the third solenoid valve S3 to control the position of the plug 124.

When the third solenoid valve S3 is controlled to a low duty state, the plug is displaced towards the left while compressing the spring 126 so that the land 128 biased by the spring 126 can be displaced towards the left.

In the above, when the shift mode is changed from the neutral "N" range to the drive "D" range, the drive pressure coming through the drive pressure passage 24 via the first friction member B1 and the manual valve 22 is fed to the first port 116 of the torque control regulator valve 20.

At this point, by the above operation, the land 128 and the spool valve 132 is displaced towards the left and, at the same time, the second port 118 and the third port 120 of the torque control regulator valve 20 communicate with each other so that the hydraulic pressure coming through the second port 118 can leave through the third port 120.

The torque pressure leaving through the third port 120 is fed to the first port 152 of the N-D control valve 28 via the first port 134 of the control switch valve 26 by the OFF control of the fourth solenoid valve S4.

At this point, part of the hydraulic pressure within the line pressure passage 14 is fed to the second port 154 of the N-D control valve 28 to displace the valve spool towards the right ouch that the first and fourth ports 152 and 158 of the N-D control valve 28 communicate with each other.

Accordingly, the torque pressure fed from the torque control regulator valve 20 to the first port 152 of the N-D control valve 28 leaves through the fourth port 158 and is then fed to the first friction member C1 via the second accumulator A2.

That is, the second friction member C1 first starts its application by torque pressure. At this point, part of the hydraulic pressure leaving through the fourth port 158 of the N-D control valve 28 is fed to the fifth port 160 and acts on the right face of the third land 166 so that the valve spool of the N-D control valve 28 is displaced towards the left.

By this operation, the third and fourth ports 156 and 158 of the N-D control valve 28 communicate with each other such that drive pressure coming through the third port 156 of the N-D control valve 28 from the manual valve 22 is fed to the second friction member C1 via the orifice and the second accumulator A2, and, at this time, the first one-way clutch F1 works as a reacting element, whereby the N-D speed shift is completed.

Figure 9:
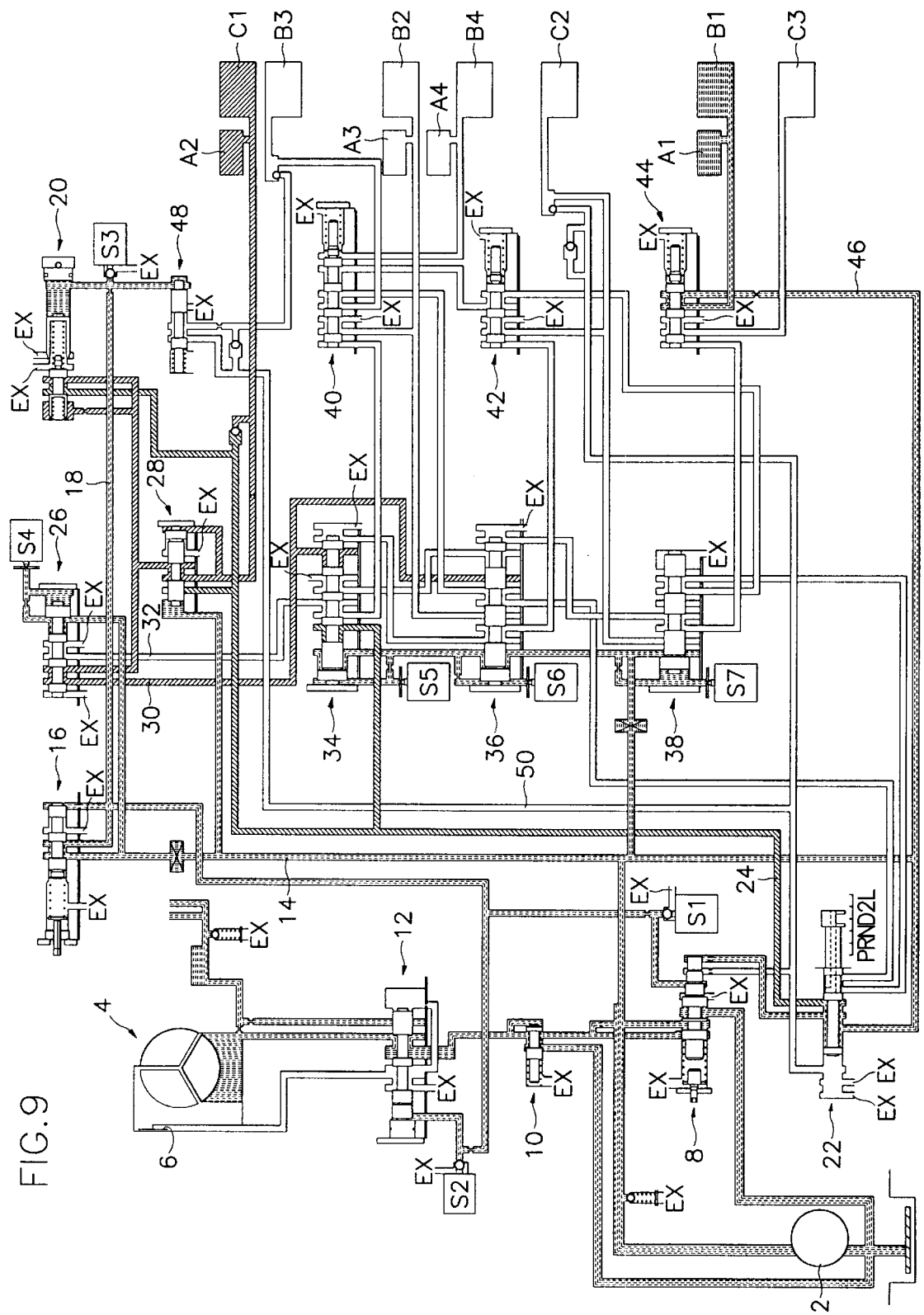
FIG. 9 is a view showing the operational state of the TCU of FIG. 1 during a manual shift operation from a neutral "N" range to the first speed of the drive "D" range.

As illustrated in FIG. 9, the first speed of the drive "D" range is obtained by controlling the hydraulic pressure coming through the second friction member C1 which supplies power to the first sun gear 410 being an input element.

The indicative marks "////" in FIG. 9 indicate drive pressure during a speed shift from the neutral "N" range to the drive "D" range while the indicative marks "\\\\" therein indicate torque control pressure.

When the shift mode is changed from the neutral "N" mode to the reverse "R" range, part of the hydraulic pressure from the manual valve 22 is fed to the second and third ports 170 and 172 of the N-R control valve 48 and then to the sixth friction member B3 being applied in the reverse "R" range. The rest of the hydraulic pressure is fed to the fourth friction member C2.

At the same time, part of the hydraulic pressure within the line pressure passage 14 is fed to the first friction member B1 through the sixth and seventh ports 356 and 258 of the fourth clutch valve 44 along the passage 46.

At this point, the N-R control valve 48 receives hydraulic pressure through the first and second ports 166 and 170.

However, since the fourth solenoid valve S4 is controlled to an OFF state and the third solenoid valve is duty-controlled, the second and third ports 170 and 172 communicate with each other, and thereby the control pressure replaced from the line pressure can be fed to the sixth friction member B3.

Further, if line pressure fed to the third solenoid valve S3 is controlled simultaneously with the first solenoid valve S1, shift shock of the reverse drive pressure acting on the sixth friction member B3 can be largely reduced.

Figure 10:
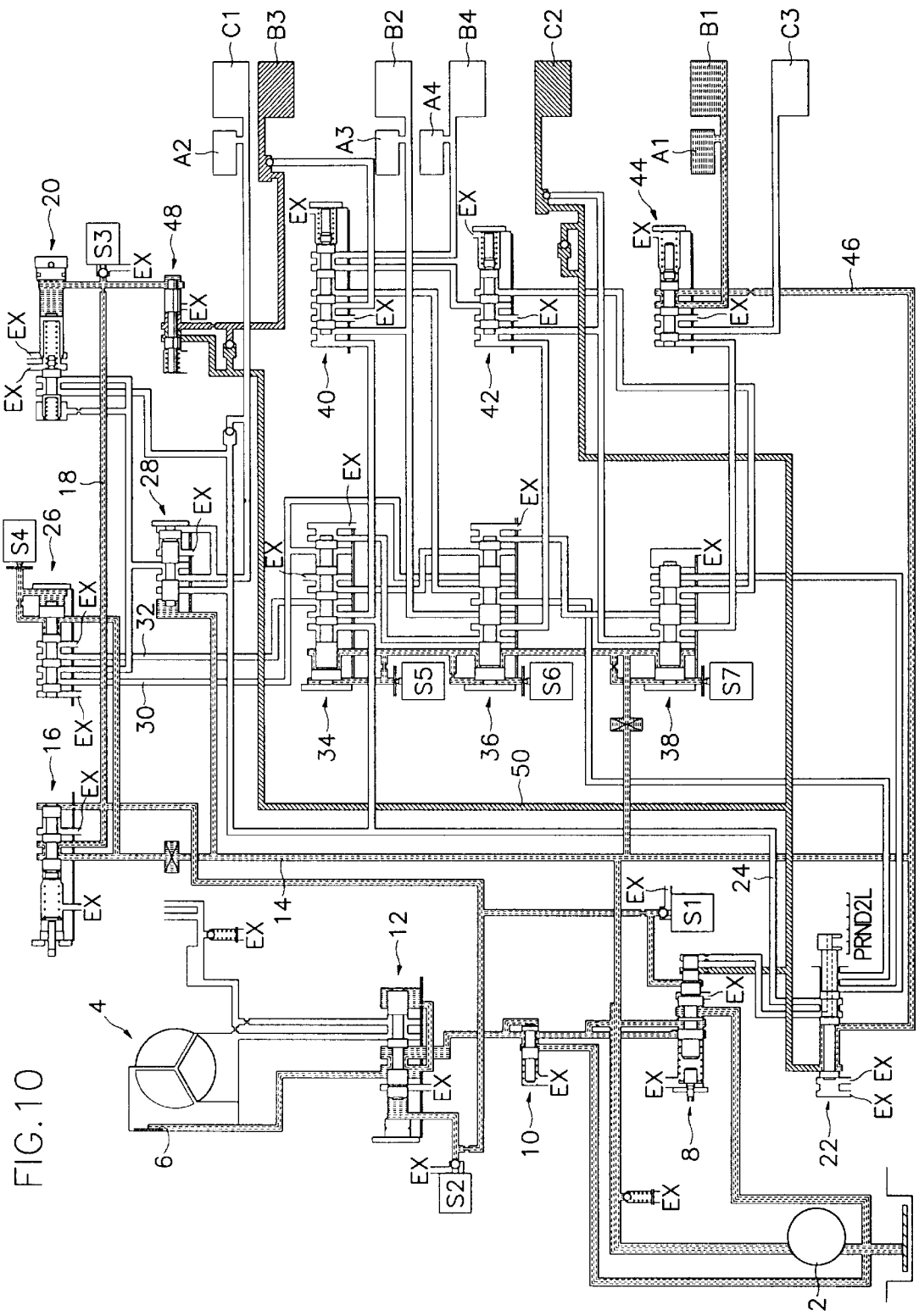
FIG. 10 is a view showing the operational state of the TCU of FIG. 1 during a manual shift operation from the neutral "N" range to a reverse "R" range.

As illustrated in FIG. 10, the manual speed shift from the drive "D" range to the reverse "R" range is obtained by controlling hydraulic pressure, fed to the sixth friction member B3 together with each application of the first and fourth friction member B1 and C2, with control pressure.

The indicative marks "/////" in FIG. 10 indicate line pressure during speed shift from the neutral "N" range to the reverse "R" range while the marks "\\\\\" therein indicate control pressure during the speed shift from the neutral "N" range to the reverse "R" range.

When the shift mode is manually changed from the fourth speed of the drive "D" range, in which the second, third, fourth and fifth friction members C1, B2, C2 and C3 are applied, to the second speed of the second "2" range, the fourth solenoid valve S4 is controlled from an ON state to an OFF state while the sixth solenoid valve S6 in changed from an OFF state to an ON state, and thereby the torque pressure applied to the third solenoid valve S3 can be released.

Then, the seventh solenoid valve S7 is changed from an ON state to an OFF state to thereby displace the valve spool of the third-to-fourth speed shift valve 38 towards the right, and thus the sixth and seventh ports 256 and 258 communicate with each other. At this point, the drive pressure in the second "2" range is fed to the seventh friction member B4 through the sixth and seventh ports 256 and 258 as well as the second and third clutch valves 40 and 42 while controlled by the fourth accumulator A4.

Figure 11:
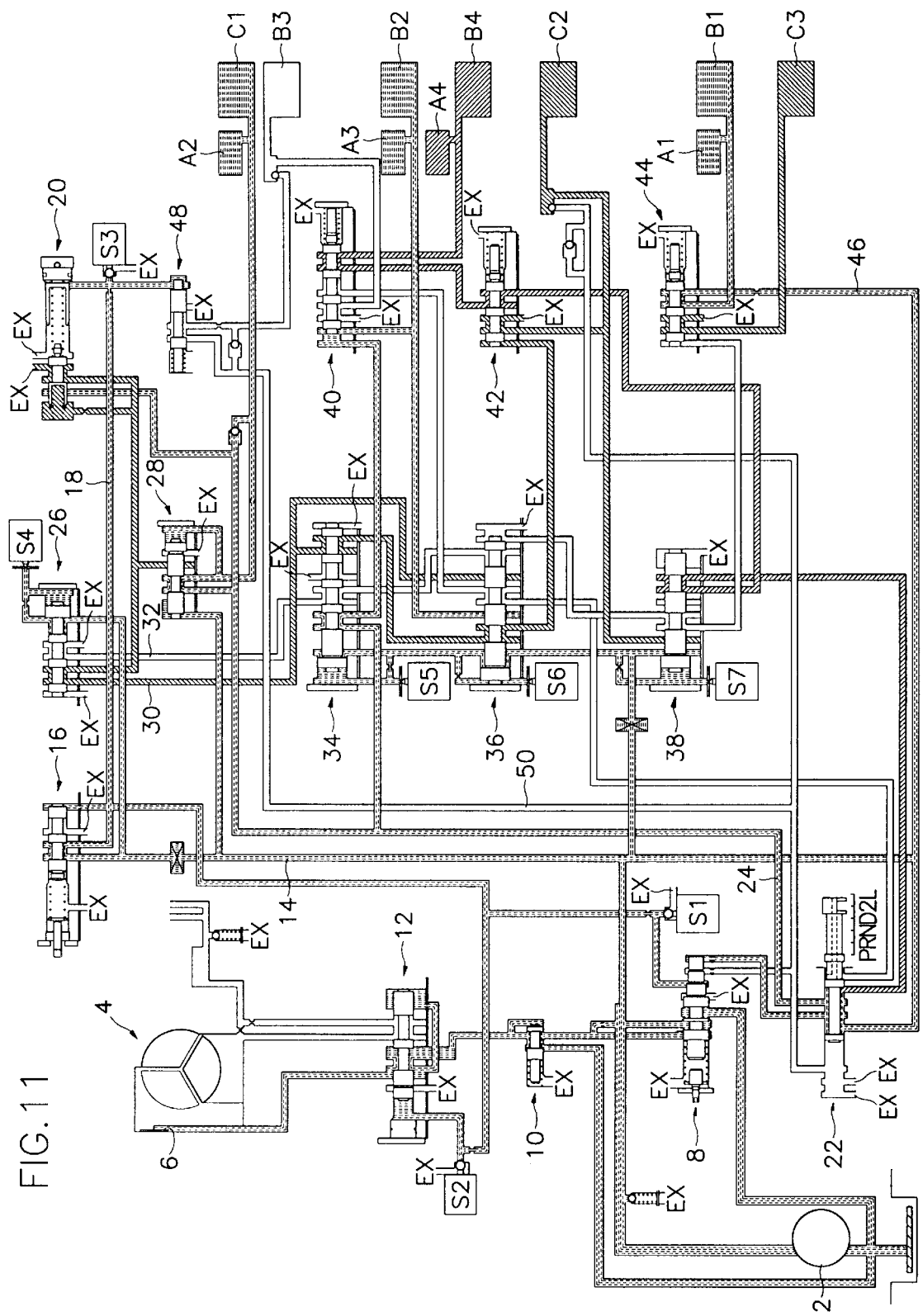
FIG. 11 is a view showing the operational state of the TCU of FIG. 1 during a manual shift operation from the fourth speed of the drive "D" range to the second speed of a second "2" range.

As illustrated in FIG. 11, when the control pressure applied to the third solenoid valve S3 is released, the fourth and fifth friction members C2 and C3 are also released and the first friction member B1 is controlled by the first accumulator A1, and thus the speed shift to the second speed of the second "2" range can be achieved.

The indicative marks "/////" in FIG. 11 indicate the hydraulic pressure released during the skip speed shift from the fourth speed of the drive "D" range to the second speed of the drive "D" range while the marks "\\\\\" indicate the hydraulic pressure fed in the second speed of the second "2" range.

When the shift mode is changed from the third speed of the drive "D" range, in which the first, second, third and fourth friction members E1, C1, B2 and C2 are applied, to the first speed of the lockup "L" range, the fourth solenoid valve S4 is controlled from an OFF state to an ON state while the fifth solenoid valve S5 is controlled from an ON state to an OFF state, and thereby operations of the third and fourth friction members B2 and C2 applied in the third speed of the drive "D" range are released.

At the same time, the fourth solenoid valve S4 is changed from an ON state to an OFF state and then feeds the torque pressure controlled by the third solenoid valve S3 to the sixth friction member B3 via the first torque pressure passage 30.

Figure 12:
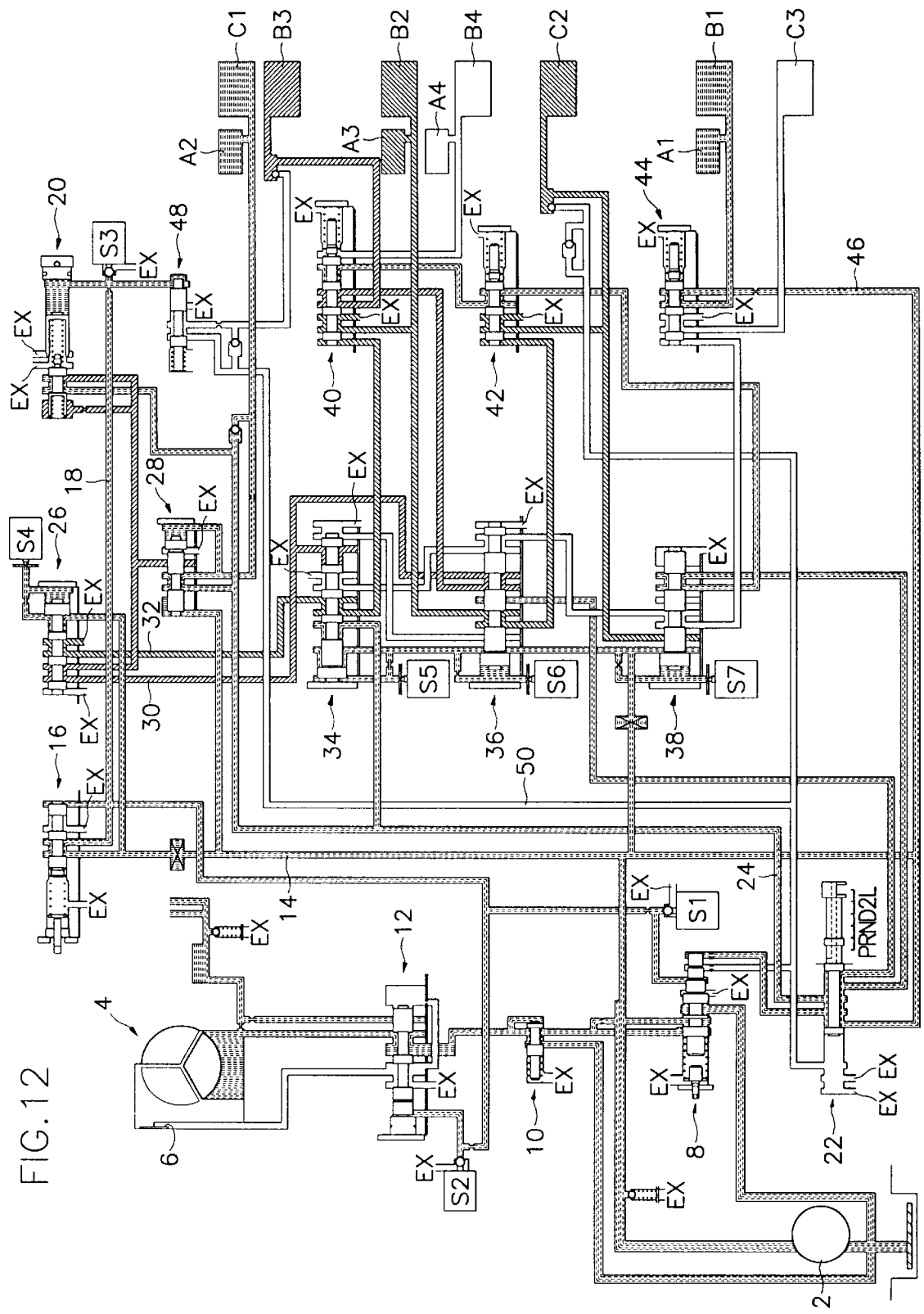
FIG. 12 is a view showing the operational state of the TCU of FIG. 1 during a manual shift operation from the third speed of the drive "D" range to the first speed of a lockup "L" range.

As illustrated in FIG. 12, after the sixth friction member B3 is controlled, the valve spool of the second-to-third speed shift valve 36 is displaced towards the left by the sixth solenoid valve S6 controlled from an OFF state to an ON state. Thus, the lockup "L" range pressure fed from the manual valve 22 is fed to the sixth friction member B3 through the second clutch valve 40 via the ninth and seventh ports 230 and 224, and thereby the second speed of the second "2" range is reached.

The indicative marks "/////" in FIG. 12 indicate the hydraulic pressure released during the skip speed shift from the third speed of the drive "D" range to the first speed of the lockup "L" range while the marks "\\\\\" therein indicates the hydraulic pressure fed in the first speed of the lockup "L" range.

When the shift mode is manually changed from the fourth speed of the drive "D" range to the first speed of the lockup "L" range, drive pressure from the manual valve 22 is fed to the second-to-third speed shift valve 36 and the third-to-fourth speed shift valve 38 to perform the fourth-to-first skip speed shift.

The drive pressure applied to the seventh friction member B4 is interrupted by the seventh solenoid valve and the sixth friction member B3 is controlled with torque pressure like in the speed shift from the third speed of the drive "D" range to the first speed of the lockup "L" range to absorb shift shock.

Further, it is possible to perform manual speed shifts from the reverse "R" range to the drive "D" range and vice versa, from the second and third speeds of the drive "D" range to the second speed of the second "2" range, from the fourth and third speeds of the drive "D" range to the second speed of the second "2" range, from the second and third speeds of the drive "D" range to the second speed of the second "2" range, from the fourth and third speeds of the drive "D" range to the first speed of the second "2" range, from each the first speed of the drive "D" and second "2" ranges to the first speed of the lockup "L" range, from the drive "D" range to the lockup "L" range via the second "2" range, from the lockup "L" range to the drive "D" range via the second "2" range.

That is, it is easy to shift the speed by the first and second one way clutches F1 and F2 in the first and second speeds of the drive "D" range as well as by the first one way clutch F1 in the first speed of the second "2" range. For this reason, when the engine brake effect is not generated, manual shift to the second speed of the second "2" range or the first speed of the lockup "L" range, which can generate the engine brake effect, should be performed.

The manual speed shift from the reverse "R" range to the drive "D" range rapidly releases the R-N speed shift and controls the N-D speed shift while the manual speed shift from the drive "D" range to the reverse "R" range rapidly releases the D-R speed shift and controls the R-N speed shift.

What is claimed is:

1. A manual shift control device of a transmission control system for an automotive automatic transmission, comprising:

a hydraulic pump for generating hydraulic pressure, the hydraulic pump being operated by the driving force of an engine;

a pressure regulator valve for regulating hydraulic pressure generated from the hydraulic pump in response to the vehicle's driving conditions;

a solenoid feed valve for feeding line pressure passing through the pressure regulator valve to first, second and third solenoid valves via line pressure passages;

a manual valve for feeding hydraulic pressure to a drive pressure passage in a drive "D" range and to a reverse pressure passage in a reverse "R" range while varying its ports in accordance with the position of a shift selector lever;

a torque control regulator valve for changing drive pressure fed from the manual valve into torque pressure in accordance with the duty-control of a third solenoid valve;

a control switch valve for alternately feeding torque pressure fed from the torque control regulator valve to first and second torque pressure passages in accordance with the ON/OFF operation of a fourth solenoid valve;

an N-D control valve for sequentially feeding torque pressure and drive pressure to a second friction member, which is applied at an initial shift operation together with a first friction member, to thereby alleviate shift shock occurring in a shift operation from a neutral range "N" to the drive range "D";

a first-to-second speed shift valve for feeding part of the torque pressure fed from the first and second torque pressure passages as well as part of the drive pressure fed from the manual valve to a third friction member through a second clutch valve while varying its ports in accordance with the ON/OFF operation of a fifth solenoid valve during a shift operation from the first speed to the second speed of the drive "D" range;

a second-to-third speed shift valve for feeding part of the torque pressure fed from the first-to-second speed shift valve as well as part of the hydraulic pressure fed to the third friction member to a fourth friction member through a third clutch valve while varying its ports in accordance with the ON/OFF operation of a sixth solenoid valve during a shift operation from the second speed to the third speed of the drive "D" range;

a third-to-fourth speed shift valve for feeding part of the torque pressure fed from the second-to-third speed shift valve as well as part of the hydraulic pressure fed to the fourth friction member through a fourth clutch valve and, at the same time, interrupting the hydraulic pressure feeding to the first friction member while varying its ports with the operation of a seventh solenoid valve during a shift operation from the third speed to the fourth speed of the drive "D" range, the third-to-fourth speed shift valve feeding drive pressure fed from the manual valve to the seventh friction member through the third and second clutch valves during a manual shift operation from the fourth speed of the drive "D" range to the second speed of a second "2" range;

an N-R control valve for feeding hydraulic pressure fed from the manual valve via the reverse pressure passage to a sixth friction member while varying its ports in accordance with the control of the third solenoid valve in the reverse "R" range; and a shock alleviating means for absorbing shift shock by hydraulic pressure;

wherein the shock alleviating means comprises a first accumulator being controlled when the shift mode changes from the fourth speed of the drive "D" range to the second speed of the second "2" range as well as to the second speed of the drive "D" range, the fifth friction member is controlled, and hydraulic pressure is applied to the sixth friction member by the mechanical control.

2. The manual shift control device of claim 1, wherein the shock alleviating means comprises a second accumulator A2 being disposed on the passage for feeding hydraulic pressure from the N-D control valve to the second friction member to absorb shift shock generated by torque pressure.

3. The manual shift control device of claim 1, wherein the shock alleviating means comprises a fourth accumulator A4 being disposed on the passage for feeding hydraulic pressure from the second clutch valve to the seventh friction member to alleviate shift shock generated by drive pressure.

4. The manual shift control device further comprising a power train, wherein the power train comprises:

an engine being a power source;

a torque converter connected to a crankshaft of the engine;

a first shift part comprising a compound planetary unit, which is composed of two simple planetary gear units, the compound planetary unit having a first sun gear being formed in a body with a second shaft to thereby selectively work as an input element, the second shaft being connected to a first shaft by inserting the second friction member therebetween, a second pinion gear being connected to a first ring gear through a second power transmission member to be controlled by a first one way clutch and the sixth friction member therebetween and thereby work as a reacting element, a first pinion gear being connected to a second ring gear through a third power transmission member to be an output element, and a second sun gear being formed in a body with a second shaft to selectively work as an input element, the second shaft being connected to the first shaft by inserting a first power transmission member and the fourth friction member therebetween, the second sun gear being controlled by a second one way clutch and the third and seventh friction members to thereby be a reacting element;

a second shift part comprising a simple planetary gear unit having a third ring gear meshing with a first output gear of the first shift part to be an input element, a third pinion gear meshing with the third ring gear to be an output element, a third sun gear being controlled by a third one way clutch and the first friction member to thereby be a reacting element.

* * * * *

UNITED STATES PATENT AND TRADEMARK OFFICE
CERTIFICATE OF CORRECTION

PATENT NO.:        5,813,941

DATED:             September 29, 1998

INVENTOR(S):       Jae Duk Jang

It is certified that an error appears in the above-identified patent and that said Letters Patent is hereby corrected as shown below:

On the Title Page, Item [75], in the Inventors, line 1, "Kyunhki-do" should read --Kyungki --.

Signed and Sealed this

Sixteenth Day of February, 1999

Attest:

Attesting Officer

Acting Commissioner of Patents and Trademarks